Patented Sept. 30, 1941

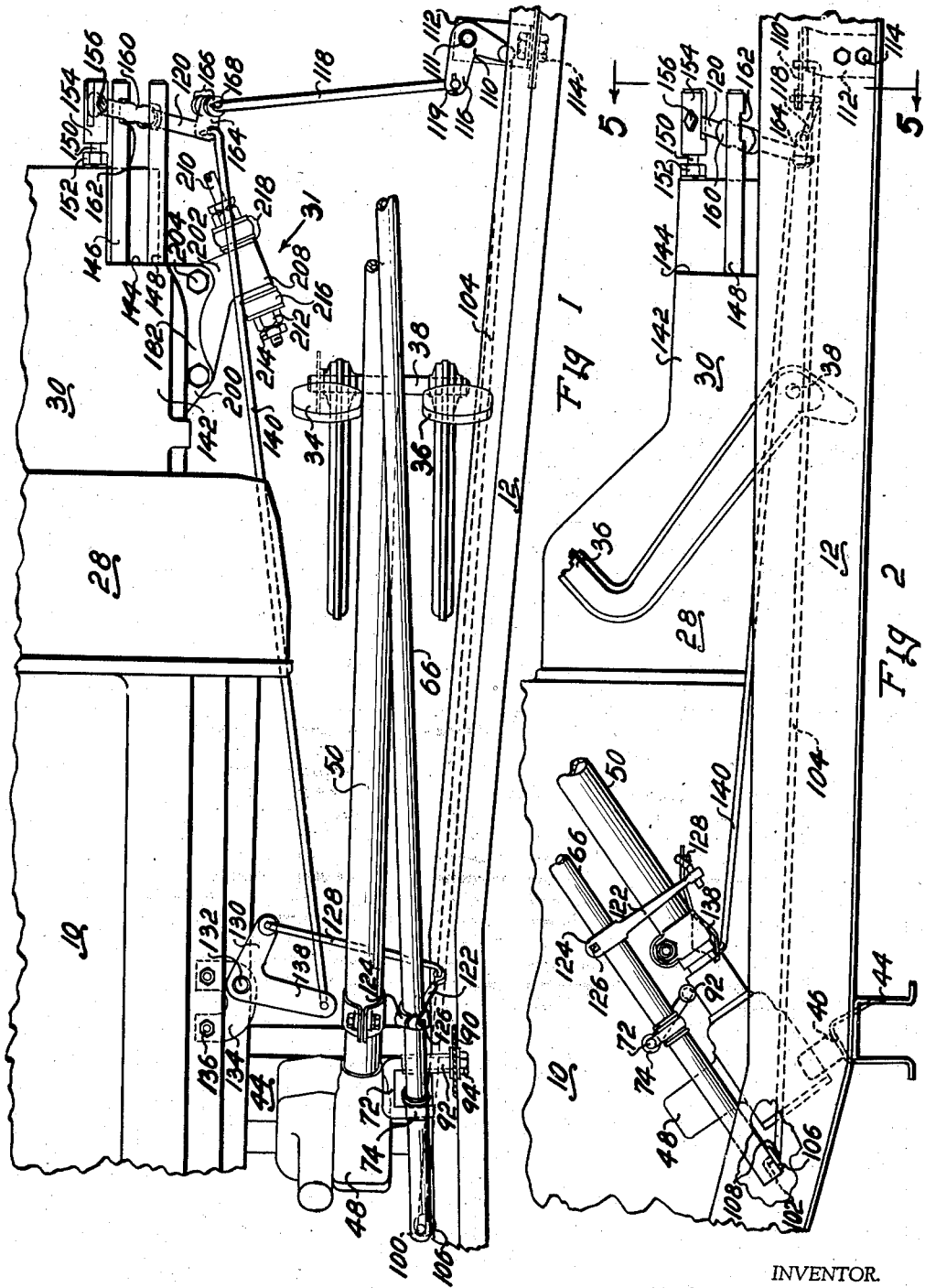

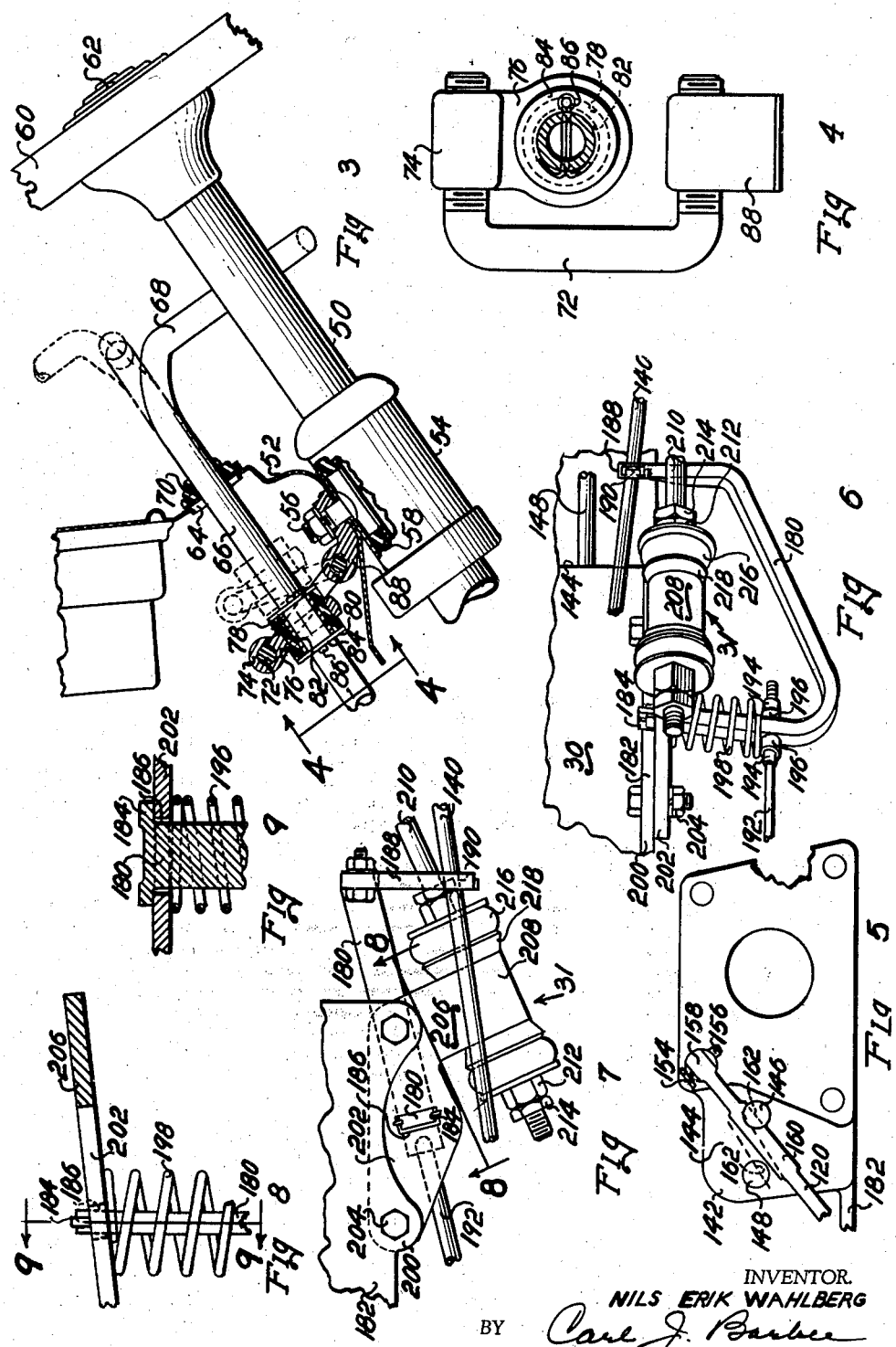

2,257,632

UNITED STATES PATENT OFFICE 2,257,632

GEAR SHIFTING MECHANISM

Nils Erik Wahlberg, Kenosha, Wis., assignor to Nash-Kelvinator Corporation, Kenosha, Wis., a corporation of Maryland Application February 14, 1940, Serial No. 318,809

7 Claims. (Cl. 74—484)

This invention relates to remote control gear shifting mechanism and has particular reference to mechanism operable from the steering column for preselecting a desired ratio in a transmission of an automobile.

It is an object of my invention to provide a remote gear shift mechanism which is cheaper to construct and install than mechanism known heretofore.

It is another object of my invention to provide shifting mechanism operable from a single control shaft.

It is another object of my invention to provide a shifting mechanism in which the main shifting shaft is journaled to rotate but which requires no journals for longitudinal movement.

It is another object of this invention to provide shifting mechanism for selecting either of two shift rails which are to be operated upon and for moving either of these shift rails into a plurality of positions.

It is another object of this invention to provide shifting mechanism with a single operating shaft rotatable to locate the position of a shift rail and rockable along a longitudinal axis to select one of a plurality of shift rails to be operated on.

Other objects and advantages of this invention will be apparent from a consideration of the following description and the attached drawings of which there are two sheets and in which Figure 1 represents a plan view of the motor compartment of an automobile, the hood and body portion of the automobile being broken away to better illustrate the position of my shifting mechanism;

Figure 2 is a side elevation of the mechanism illustrated in Figure 1;

Figure 3 is a vertical longitudinal section through the instrument panel of an automobile showing the upper end of my shift mechanism as installed along the steering column;

Figure 4 is a section taken along the line 4—4 of Figure 3 and looking in the direction of the arrows;

Figure 5 is a section taken along the line 5—5 of Figure 2 and looking in the direction of the arrows;

Figure 6 is a side elevation of a modified structure for selecting the shift rail to be operated upon by my shifting mechanism;

Figure 7 is a plan view of the structure shown in Figure 6;

Figure 8 is a vertical section taken along the line 8—8 of Figure 7 and looking in the direction of the arrows; and Figure 9 is a section taken along the line 9—9 of Figure 8 and looking in the direction of the arrows.

In the drawings in which similar reference characters are used to denote similar objects, I have shown an automobile having a motor 10 which may be mounted upon a frame 12 by any suitable means known to the art today.

The motor 10 is provided with a clutch housing 28 and a transmission housing 30 which I have shown to be cast integrally with the motor block 10. However, my invention may be applied equally well to a motor and transmission which are constructed separately and later assembled. The transmission housing is provided with a flange 182 and a bracing connection generally indicated at 31 which will be more particularly described later.

The automobile is provided with a brake pedal 34 and a clutch pedal 36 which are mounted on a shaft 38 and connected to the brakes and clutch respectively by suitable linkage (not shown).

The automobile is provided with a channel shaped axle member 44 which is fastened to the side frame members 12 in any suitable manner known to the art. The axle 44 is provided with an inclined surface 46 (see Figure 2) to which is attached the steering gear 48 for the automobile. The steering gear 48 is provided with the usual steering column 50 which extends upwardly into the body of the automobile where it is fastened to the instrument panel 52 by passing it through a bearing 54 (see Figure 3) bolted to the instrument panel by means of the bolt 56. If desired, this bearing 54 may be provided with rubber or other flexible gaskets 58 to prevent transmission of vibration between the body and the steering column. The column 50 terminates at its upper end in the usual steering wheel 60 provided with a horn button 62.

In Figure 3 I have shown the instrument panel 52 to be apertured as at 64 to pass a main shifting shaft 66, the upper end of which is bent at right angles to provide an operating handle 68. The handle 68 may be provided with any desired ornamental grip and aperture 64 may be covered by flexible gaskets 70 positioned around the shaft 66. The shaft 66 is made of hollow metal tubing.

Shaft 66 is supported at its upper end by means of a U-shaped yoke 72 (see also Figure 4), one arm of which is threaded into a lug 74 from which the boss 76 depends. The boss 76 is apertured as at 78 to receive the rubber grommet 80 which yieldingly supports an annular bearing sleeve 82 along its inside surface. The main shifting shaft 66 is passed through the annular bearing 82 and is retained in proper position by means of two annular washers 84 which are retained against each end of the bearing 82 and grommet 80 by means of cotter pins 86 passed through the shaft 66.

The lower arm of the yoke 72 is threaded into a lug 88 which is rigidly fastened to the instrument panel 52 by the same bolt 56 which holds the steering column bearing in place. Since both of the connections between the arms of the yoke 72 and the lug 88 and lug 74 are threaded connections, it is evident that the shaft 66, fixed to the lug 74 may be moved up and down axially by causing the yoke 72 to rotate about the lug 88 and the lug 74 to rotate about the upper arm of the yoke. At the same time the shaft 66 is capable of rotary motion within the bearing sleeve 82.

Illustrated in Figures 1 and 2, the lower end of the shaft 66 is supported by a yoke 72 and bracket 74 similar to that at the top of the shaft. The lower yoke 72 is supported from a portion of the car body 90 by means of a hollow shaft 92 fastened to the body by means of a threaded cap screw 94. The lower yoke 72 and bracket 74 are mounted parallel to the upper yoke and bracket so that the axis of the shaft 66 will always move in a single plane and lie in positions parallel to one another and yet be free to rotate about its axis.

The lower end of the shaft 66 is provided with a hole 100 (see Figure 1) in its lower wall, which hole is arranged to receive the hooked end 102 of a shift rod 104 which is bent so that the center portion of the bend will be normal to the axis of the shaft 66. The rod 104 is provided with a washer 106 held against the underside of the shaft 66 by means of a pin 108 passed through the rod 104. With the end of the rod 104 resting inside of the shaft 66 and the washer 106 pinned to the rod 104 just underneath the shaft, the normal portion of the rod 104 is retained adjacent to the edges of the hole 100. Thus when the shaft 66 is raised by lifting on the handle 68, the rod 104 will be given a backward movement by the lower end of the shaft 66 acting against the under side of the bend and the washer 106. When the shaft 66 is lowered, the upper edge of the aperture 100 will draw the hooked end 102 of the rod 104 forward.

The rod 104 is carried back alongside of the frame member 12 to one arm of a bell crank 110 which is pivoted at 111 upon a bracket 112 fastened to the frame 12 by means of bolts 114. Movement of the rod 104 serves to rotate the bell crank 110 about its pivot 111 so that the inner arm 116 of the bell crank 110 will cause a transverse link 118 to move generally transversely of the car. The link 118 may be formed of rod stock and fastened to the arm 116 by bending up one end of the bar and passing it through a hole in the arm 116. The connection may be secured by a pin 119. The inner end of the bar 118 is fastened to a selector bar 120 in a manner which will be more particularly described later. Fastened near the lower end of the shaft 66 and just above the lower yoke 72 is an arm 122 which is provided with a split end 124 drawn down around the shaft 66 and clamped thereto by a bolt 126. The lower end of the arm 122 is apertured to receive the bent over end of a cross link 128, the other end of which is connected to a second bell crank 130. The bell crank 130 is pivoted at 132 to a U-shaped clip 134 fastened to the motor block by means of the bolts 136. The bell crank 130 is provided with a laterally extending arm 138 from which a second shift rod 140 extends backwardly to the selector bar 120. It should thus be evident that as the shaft 66 is rotated the arm 122 will move the link 128 transversely of the car to rotate the bell crank 130 about its pivot 132. Movement of the bell crank 130 will cause the end of the arm 138 to move generally backward and forward to move the shift rod 140 longitudinally of the automobile to operate the selector bar in a manner which will be more particularly described later.

The transmission housing 30 is provided towards its rear portion with an offset portion 142 which has a vertical face 144 at the rear thereof. Face 144 is apertured in two places to accommodate the two shift rails 146 and 148 which are slidable longitudinally through the wall of the transmission case. My invention contemplates the use of any transmission which is shiftable by the movement of the shift rails such as 146 and 148. This type of transmission provided with shift forks on the shift rails is common in the art today and will not be described further. The extreme rear surface of the transmission casing is provided with a threaded bolt 150 held in place by means of the lock nut 152 and projecting toward the rear of the car. The threaded bolt 150 is arranged to receive the internally threaded bifurcated cap 154 which is loosely threaded on the bolt 150 so that it is capable of turning about the bolt through several degrees of rotation. The bifurcations of the cap 154 are drilled and tapped to receive the threaded bolt 156 transversely of the axis of the cap 154. The bolt 156 pivotally supports the selector bar 120 which has a finished end portion 158 which fits between the bifurcations of the cap 154 and is drilled so as to rock on the bolt 156. The selector bar 120 is provided near its center with a shift rail engaging portion 160 having two circular lobes which are arranged to fit in grooves 162 cut in the adjacent surfaces of each shift rail. When the selector bar 120 is arranged between the shift rails 146 and 148, it is rotatable about the bolt 150 to swing downwardly into engagement with the notch 162 in the shift rail 146 (as shown in Figure 5) or upwardly into engagement with the notch in the shift rail 148. It is to be noted that when the selector bar is in engagement with one shift rail, it is free from the other shift rail and may move the engaged rail without moving the other rail. At the same time the two shift rails are so spaced with respect to the thickness of the selector bar that the selector bar 120 may not be moved out of engagement with one shift rail until the notches 162 are in alignment so that the rail may be moved from one notch to the other one. I contemplate adjusting the shift rails so that the notches 162 will be opposite each other when the transmission is in neutral position. In this manner I have provided a crossover means since one shift rail must be returned to the neutral position before the selector bar may be moved into operative relationship with the other shift rail.

The extreme lower end of the selector bar 120 is provided with an inclined plate 164 (see Figures 1 and 2) which I have shown to be forged as an integral part of the selector bar itself. This plate 164 is apertured in two places to receive the ends of the transverse link 118 and the shift rod 140. The shift rod 140 is engaged in its corresponding aperture by simply bending over the end of the rod 140 and inserting a pin through the bent over portion below the plate 164. The link 118 is preferably passed through the plate 164 and provided with washers 166 (see Figure 1) on each side of the plate 164. The washers are retained in place by means of pins 168 passed through the link 118. From this construction it is evident that movement of the link 118 towards the center of the car will swing the lower end of the selector bar 120 downwardly about the bolt 150 as a pivot and engage the selector bar with the inside shift rail 146. The reverse movement will engage the selector bar with the outside shift rail 148. With the selector bar in engagement with either of the shift rails a backward movement of the shift rod 140 will swing the lower end of the selector bar 120 to the rear about the bolt 156 as a pivot and cause the rail engaging portion 160 to draw the engaged shift rail to the rear. A reversal of this movement will cause the selector bar to move the engaged shift rail forward.

Considering the entire structure, downward movement of the operating handle 68 operates to draw the shift rod 104 forward and rotate the crank 110 to move the link 118 toward the center to engage the inside shift rail 146 as has just been described. Since the standard practice in automobile shifting today is to have the lower position of the operating lever connected to the intermediate and direct drive gears, this inner shift rail 146 will preferably be connected to the intermediate and direct drive gears in the transmission. The reverse movement of the linkage just described will of course engage the selector bar 160 with the shift rail 148 which will be connected to the low and reverse gearing in the transmission. A clockwise rotation of the operating handle 68, as viewed from the operator's position, serves to move the arm 122 in a clockwise direction and draw the link 128 toward the left side of the car. This motion rotates the bell crank 130 so that arm 138 will draw the shift rods 140 forward. Forward motion of the rod 140 moves the selector bar 120 forward as has been explained, causing the shift rail which happens to be engaged with the selector bar to move forward. Since clockwise rotation of the operator's handle standardly engages the gears in low or direct drive position, my transmission is preferably arranged so that forward movement of the shift rail 146 will engage the transmission in direct drive, while forward movement of the shift rail 148 will engage the transmission in low gear. The reverse movement of this linkage will, of course, engage the transmission in either intermediate or reverse gearing.

The transmission housing is shown (see Figure 1) to have a horizontal flange 182 along its bottom side. This flange has a widened portion 200 to which a plate 202 is fastened by means of bolts 204. The plate 202 has a portion 206 which extends away from the side of the transmission and is forged or otherwise suitably shaped to form a boss 208 to receive the threaded end of brace rods 210. Although only one brace rod appears in these views, I contemplate the use of a rod from each side of the transmission, which rods will extend diagonally back and be fastened to opposite ends of the rear axle (not shown). The brace rods are maintained in position by the nuts 212 and lock nuts 214. The connection is cushioned by rubber biscuits 216 protected from wear by the washers 218.

In Figures 6 through 9 I have illustrated a modified method for moving the selector bar into engagement with either of the shift rails. As illustrated I have provided a generally U-shaped bracket 180 which is supported from the transmission housing by slotting the plate 202 as at 186. The forward end of the bracket 180 is provided with ears 184 which prevent the bar from sliding completely through the slot 186 and thus supports the front end of the bar. It will be noted that the slot 186 is considerably larger than the cross section of the bracket 180 so that the bracket may be swung in a generally vertical plane through several degrees of arc. The rear end of the bracket 180 has bolted to its upper end a support 188 which I have shown to be made of metal folded into a generally box shaped structure. The support 188 is apertured at 190 to loosely support the rod 140 which serves the same purpose as in the structure first described.

The forward arm of the bracket 180 is apertured to receive the rod 192 which is conveniently held in place by means of the nuts 194 and rubber washers 196. I have also provided the coil spring 198 which is compressed between the nuts 194 and the flange 182. This spring serves to prevent the bracket 180 from rattling in the slot 186. The rod 192 serves the same purpose as the shift rod 104 and is connected at its forward end with the shaft 66 in the same manner as the rod 104 in the structure disclosed in Figures 1 and 2.

With this structure it should be evident that the rod 192 may be moved to the rear or right as seen in Figure 6 to swing the U-shaped rod 180 in a counterclockwise direction, thus raising the support 188 and the back end of shift rod 140. Raising the back end of the shift rod 140 serves to raise the selector bar 120 to engage the shift rail 148. Forward movement of the rod 192 will lower the shift rod 140 and engage the selector bar with the shift rail 146. With either shift rail engaged with the selector bar, the shift rod 140 may be moved forward or backward through the aperture 190 in the support 188 to move the shift rails in the same manner as was described in connection with Figures 1 through 5. With this type of support for the shift rod 140 the bell crank 110 and link 118 and the connection 166, 168 as shown in Figure 1 may be dispensed with since their function is performed by the bracket 180, support 188, and the rear end of shift rod 140.

My invention is obviously applicable to various arrangements with various combinations of motor and frame of the automobile and is further not restricted to automotive use. While I have described this example of my invention in some detail, I do not intend this description to be limiting and reserve the right to all structures covered by the following claims.

I claim:

1. In an automobile having a transmission shiftable by movement of one of two shift rails, a selector bar pivoted at one end to be engaged with either of said shift rails, said selector bar also being pivoted for movement in a plane at right angles to said first pivot, a link for moving said selector bar in said first plane of rotation, a second link for moving said selector bar in said second plane of rotation, a main shaft mounted for axial and rotative movement, linkage connecting said first link with said main shaft subject to the axial movement of said shaft and linkage connecting said second link with said main shaft subject to rotative movement of said main shaft, 2. In an automobile having a transmission shiftable by axial movement of two shift rails, a selector bar engageable with either of said shift rails, means pivoting one end of said selector bar in one plane of rotation, means pivoting the same end of said selector bar in a second plane of rotation, a main shaft in said automobile, linkage connecting the selector bar with said main shaft to rotate said selector bar in one of said planes of rotation, other link means between said main shaft and said selector bar for rotating said selector bar in the second of said planes of rotation.

3. In an automobile having a transmission arranged to be operated by axial movement of two shift rails, a selector bar, a universal joint for one end of said selector bar, a shift rod fastened to the other end of said selector bar, a support for said shift rod positioned near the rear end thereof, means for raising or lowering said support, means for moving said shift rod along the axis thereof, and a main operating shaft, said means for raising and lowering said support and said means for moving said shift rod both being connected to said main operating shaft.

4. In an automobile shift mechanism, an instrument panel defining an aperture, a steering column, a journal for said steering column, a bracket, a bolt fastening said bracket and said journal to said intrument panel, an operating shaft having a handle thereon and extending through said aperture, a journal for said operating shaft, and a yoke between said journal for said operating shaft and said bracket.

5. In a steering column shifting device, a hollow main operating shaft having a handle thereon, an aperture in the wall of said shaft at the lower end thereof, a shift rod engaged in said aperture, and supports for said operating shaft, said supports being rockable to give said operating shaft axial motion.

6. In combination with a transmission having two shift rails, a slot formed in each of said shift rails and facing each other, a selector bar having one end pivotally supported on said transmission, slot engaging portions on said bar and positioned between said shift rails, a shift rod supporting the other end of said selector bar, a support for said shift rod near the end of said selector bar, means for moving said support to cause said shift rod to engage said selector bar with one or the other of said slots and means for moving said shift rod longitudinally in either position of said support.

7. In combination with an automobile having a transmission case mounted therein, a pair of shift rails connected to gear mechanism within said case and extending through a wall of said case, said rails defining slots opening toward each other, a selector bar having one end pivotally supported on said case and extending between the ends of said shift rails, a rod connected to the free end of said selector bar, means for moving said rod to engage said selector bar with either of said slots, a second rod connected to the free end of said selector bar, and means for moving said second rod axially to cause said selector bar to move either of said shift rails axially, said last mentioned means and said means for moving said first rod being operatively connected to a steering column shift mechanism.

NILS ERIK WAHLBERG.